(12) United States Patent
Muramatsu

(10) Patent No.: US 6,388,239 B1
(45) Date of Patent: May 14, 2002

(54) PROBE FOR NEAR-FIELD OPTICAL MICROSCOPE, METHOD FOR MANUFACTURING THE SAME AND SCANNING NEAR-FIELD OPTICAL MICROSCOPE

(75) Inventor: Hiroshi Muramatsu, Chiba (JP)

(73) Assignee: Seiko Instruments Inc. (JP)

(*) Notice: Subject to any disclaimer, the term of this patent is extended or adjusted under 35 U.S.C. 154(b) by 0 days.

(21) Appl. No.: 09/255,548

(22) Filed: Feb. 22, 1999

(51) Int. Cl.⁷ .............................. G02B 21/00
(52) U.S. Cl. ............... 250/201.3; 250/216; 250/306
(58) Field of Search ............... 250/201.3, 306, 250/234, 216; 359/368, 385; 73/105

(56) References Cited

FOREIGN PATENT DOCUMENTS

| EP | 622652 A1 | 11/1994 |
| JP | 10-26628 A * | 1/1998 |
| WO | WO9503561 | 2/1995 |

OTHER PUBLICATIONS

Patent Abstracts of Japan, vol. 095, No. 009 Oct. 31, 1995.
Patent Abstracts of Japan, vol. 097, No. 006 Jun. 30, 1997.
Patent Abstracts of Japan, vol. 095, No. 010 Nov. 30, 1995.

* cited by examiner

Primary Examiner—F. L. Evans
(74) Attorney, Agent, or Firm—Adams & Wilks (57) ABSTRACT

A probe for a near-field optical microscope was conceived in which a tube is thermally bent in the form of a hook; a microscopic aperture of the tube which has been thermally extended and cut away is provided at an end thereof; a part of the tube opposite to the microscopic aperture is removed to form an aperture at the removed portion to thereby provide a structure having no obstacle in the space between said aperture at the end and a near-field optical microscope utilizing the same was configured.

30 Claims, 7 Drawing Sheets

PROBE FOR NEAR-FIELD OPTICAL MICROSCOPE, METHOD FOR MANUFACTURING THE SAME AND SCANNING NEAR-FIELD OPTICAL MICROSCOPE

BACKGROUND OF THE INVENTION

The present invention relates to a scanning near-field optical microscope for observing microscopic features on and optical characteristics of the surface of a sample.

In general, conventional near-field optical, microscopes controlled by an atomic force have employed a probe which is obtained by sharpening an end of an optical propagation element such as an optical fiber, coating regions other than the end with a metal film and forming a microscopic aperture at the. end portion. While an optical fiber is primarily used as the optical propagation element, an optical fiber can not be used for observation at wavelengths in the ultraviolet region or infrared region which is important in the evaluation of physical properties because it allows propagation of beams having wavelengths generally about 350 to 1600 nm when used as a base material.

Under such circumstances, a probe has been proposed which has a hole that penetrates from an end of a probe made of silicon or silicon nitride for an atomic force microscope through a surface opposite thereto. In this case, since there is no solid substance that absorbs light in the hole connected to the aperture and the opposite surface, it is regarded usable for observation at wavelengths in the ultraviolet regions and infrared region.

Processes for manufacturing this type of probe for an atomic force microscope formed with a hole include a method wherein the hole is formed by etching and a method wherein the hole is formed by focused ion beams. According to the process utilizing etching, the hole is formed when etching proceeds to penetrate through, and etching must be stopped at a certain point in time. It is very difficult to perform etching while monitoring the formation of such a microscopic aperture and, consequently, it is quite difficult to control the size of the aperture formed. On the other hand, the method wherein the hole is formed using focused ion beams has a problem in that it results in low productivity and high manufacturing cost and has another problem in that a positional shift attributable to a drift of the focused ion beam apparatus results in the formation of a hole in a location other than an end of a probe.

In this regard, in order to spread near-field observation techniques in the ultraviolet region and infrared region, it is indispensable to provide a probe for a near-field optical microscope having good controllability on the formation of a microscopic aperture. One method for achieving this is a method reported by Lewis et al. and Shalone et al. utilizing a microscopic aperture at an end of a tube which has been thermally extended and cut away (U.S. Pat. No. 4,917,462 (1990); Rev. Sci. Instrum. 63 (1992) 4061). In this case, STM control or shear force control is employed to control the distance between a probe-and a sample. STM control has a problem in that a sample must be conductive. In the case of shear force control, although it can be used on a sample which is not conductive by oscillating the probe in the horizontal direction relative to the sample, it does not allow simultaneous observation of information relating to the physical properties of the surface of a sample, which is possible with AFM control. Here, the information, relating to physical properties includes friction, visco-elasticity, surface potential and the like, which can be detected by controlling a probe with a force in the vertical direction relative to a sample. Further, the shear force control method has a problem in that it occupies a greater space on the upper surface of a sample than in the AFM control method. The report of Shalone et al. discloses a tube probe which is bent to be usable as an AFM probe. In this case, however, since light can not be preferably propagated at the bent portion of the tube, it is difficult to provide light in an amount sufficient for measurement from a hole at the end thereof.

SUMMARY OF THE INVENTION

In order to solve the above-described problems, the inventors have conceived of a probe for a near-field optical microscope which is a thermally extended and cut away tube having a tapered portion and a microscopic aperture which part is configured as a thermally bent end portion in the form of a hook and has a structure wherein a part of the tube opposite to the microscopic aperture is removed to form an aperture at the removed portion and wherein there is no obstacle in the space between said aperture at the end.

The use of a glass tube as the above-described tube makes it possible to form a microscopic aperture and to manufacture a probe easily. In this case,.when light having a wavelength transmitted by glass is used, it is possible to prevent leakage of light because at least the outside of the tapered portion is coated with a material such as a metal which blocks an electromagnetic wave.

Further, when an optical lever method is used for controlling the distance between a sample and the probe based on atomic force control, more stable detection can be achieved by forming a mirrored surface on the surface of the tube opposite the aperture.

Furthermore, observation in the ultraviolet region and infrared region can be carried out by configuring a scanning near-field optical microscope with at least a light source, a collecting optical system, means for causing relative movement between a probe and a sample, an optical detector, and the above-described probe for a near-field optical microscope. This apparatus may have a configuration wherein collected light is introduced to said hole from the side of said probe opposite to the aperture and a configuration wherein detection light from the side of said probe opposite to the aperture is collected by an optical system.

DETAILED DESCRIPTION OF THE PREFERRED EMBODIMENTS

The contents of the present invention will now be described in detail using the drawings.

Figure 1A:
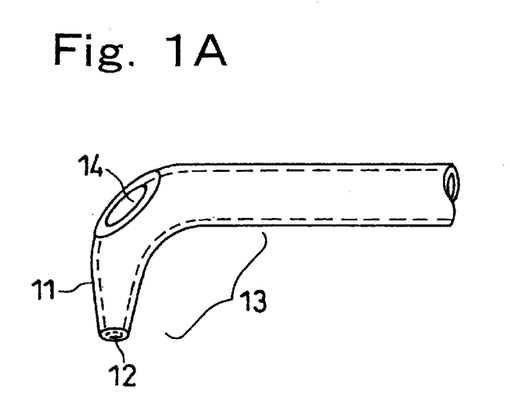
FIGS. 1A, 1B and 1C are schematic views showing a structure of a probe for a near-field optical microscope according to the present invention.
Figure 1B:
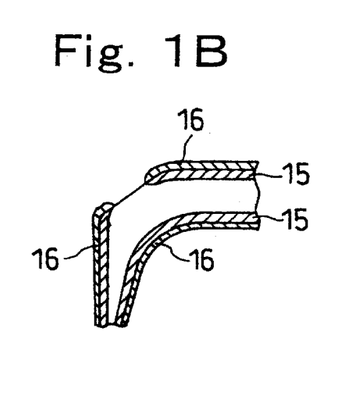
Figure 1C:
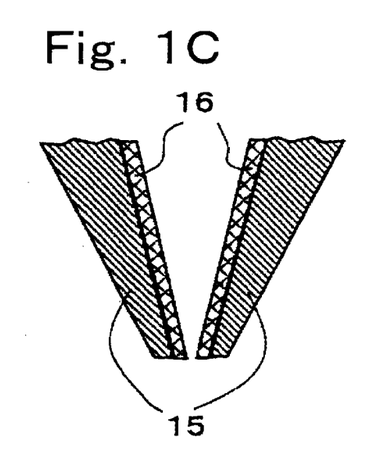

FIGS. 1A, 1B and 1C schematically show a probe for a near-field optical microscope according to the present invention. In FIG. 1A, the probe is a tube which has been thermally extended and cut away and has a tapered portion 11 and a microscopic aperture 12, which portion is configured as an end portion of a thermally bent hook-shaped portion 13 and has a structure wherein a part of the tube opposite the aperture of the bent portion is removed until the hollow of the tube is reached such that no obstacle exists in the space between an aperture 14 thus formed and the aperture 12 at the end. FIG. 1B shows a sectional view and shows an example in which a metal coating film 16 is formed around the tube 15.

While the metal coating film 16 is formed on the outer surface of the tapered portion 11 in FIG. 1B, a film such as a metal coating 16 which blocks an electromagnetic wave may be formed on the inner surface of the tapered portion as shown in FIG. 1C. This is effective when infrared light is used which is subjected to significant absorption by glass.

Figure 2A:
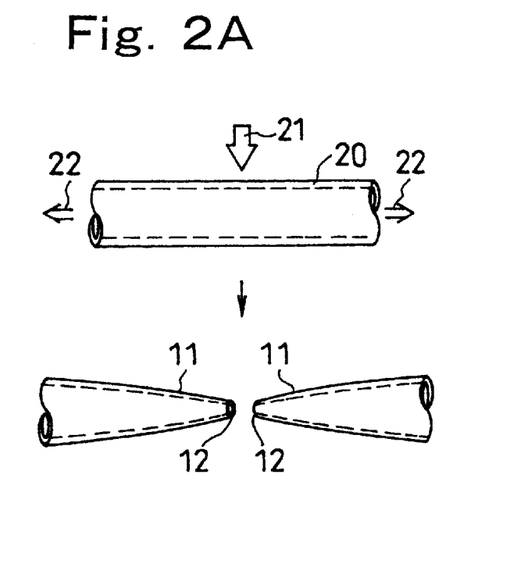
FIGS. 2A, 2B, 2C and 2D are views showing steps for manufacturing a probe for a near-field optical microscope according to the present invention.
Figure 2B:
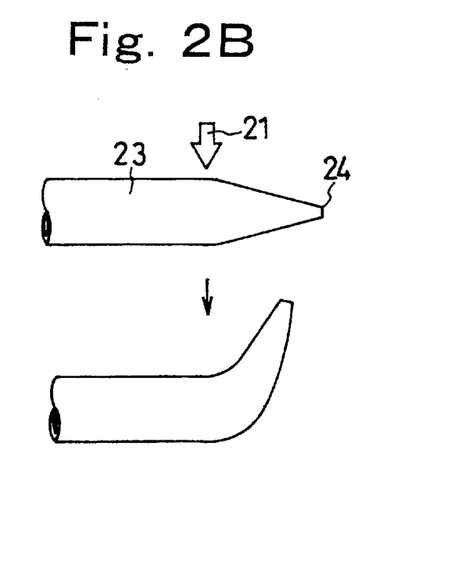
Figure 2C:
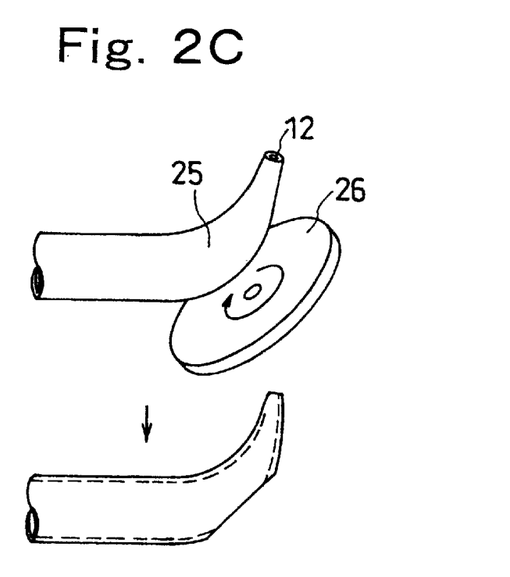
Figure 2D:
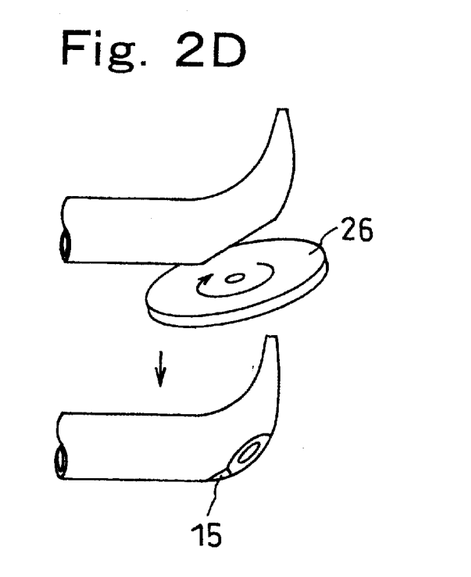

Next, FIGS. 2A, 2B, 2C and 2D show an example of steps for fabricating a probe according the present invention. In FIG. 2A, a part of a glass tube 20 is heated by, for example, laser beams 21 to apply tension 22 across the tube, thereby sharpening an end of the glass tube and forming a tapered configuration from the end. At this time, a microscopic aperture 12 that reflects the shape of the tube is formed at the end and, as is already known, the controllability of the diameter of the aperture is quite good. Means usable for heating at this time include methods such as irradiation with carbon dioxide gas laser, heating with a coil heater and heating with a burner. Next, as shown in FIG. 2B, carbon dioxide gas laser beams 21 are applied to a part of a cut away tube 23 which is about 0.1 to 1 mm apart from an end 24 on a side thereof. in one direction. As a result, the one side is heated more significantly than the other side and, when softening begins, a bent configuration can be formed on the heated side by surface tension. Subsequently, as shown in FIG. 2C, a part of the tube at the bent portion opposite to the aperture 12 at the bent portion 25 is removed until the hollow in the tube is reached. This step of removal can be carried out using a grinding plate 26. As an alternative method, focused ion beams may be used. Thereafter, as shown in FIG. 2D, when the optical lever method is used to control the distance between the sample and probe based on atomic force control, grinding is performed to form a flat portion 15 to serve as a mirror on the surface of the tube opposite the aperture. Further, when light having a wavelength transmitted by glass is used, the outside of the tapered portion is coated with a material such as a metal which blocks an electromagnetic wave. Vacuum deposition, sputtering, CVD, or electroless plating may be used to form the metal film. When the coating film is formed on the inner surface, electrolless plating or CVD may be used.

Figure 5A:
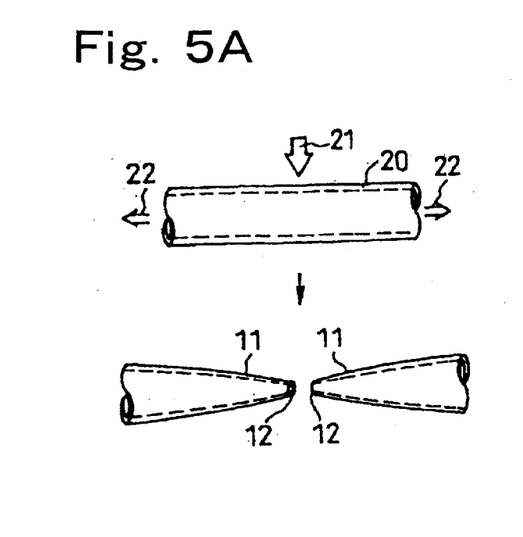
FIGS. 5A, 5B, 5C, 5D, 5E and 5F are views showing steps for manufacturing a probe for a near-field optical microscope according to the present invention.
Figure 5B:
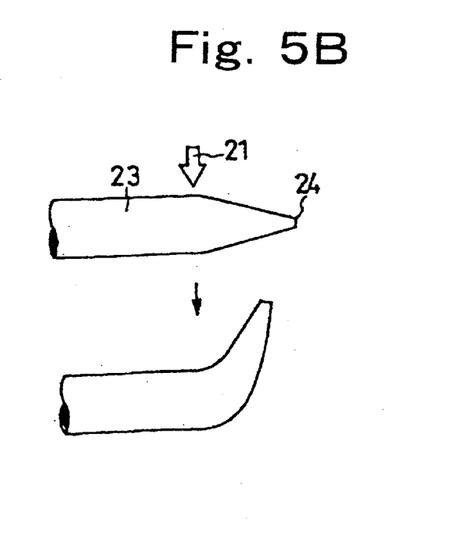
Figure 5C:
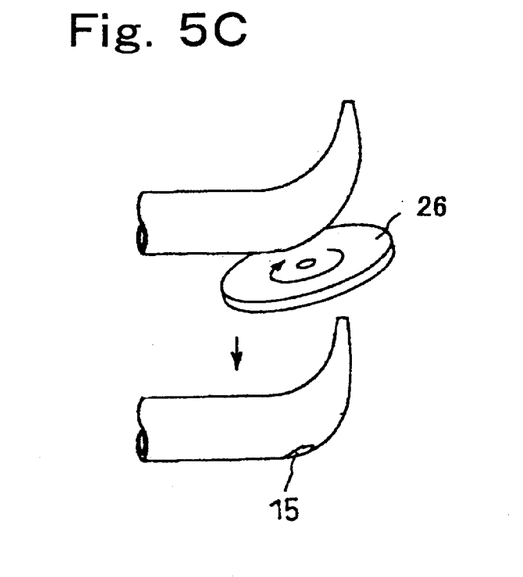
Figure 5D:
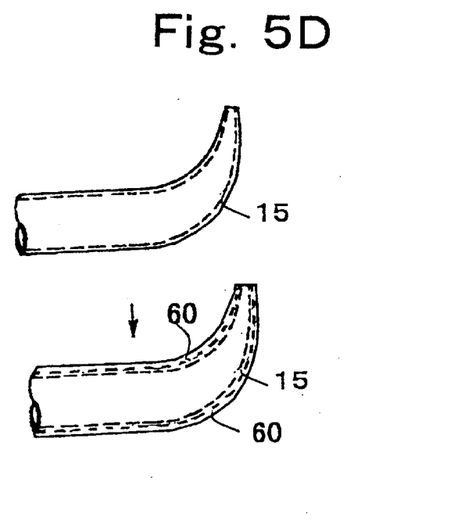
Figure 5E:
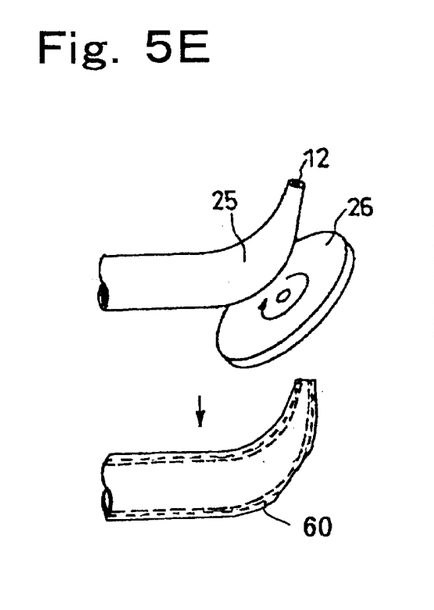
Figure 5F:
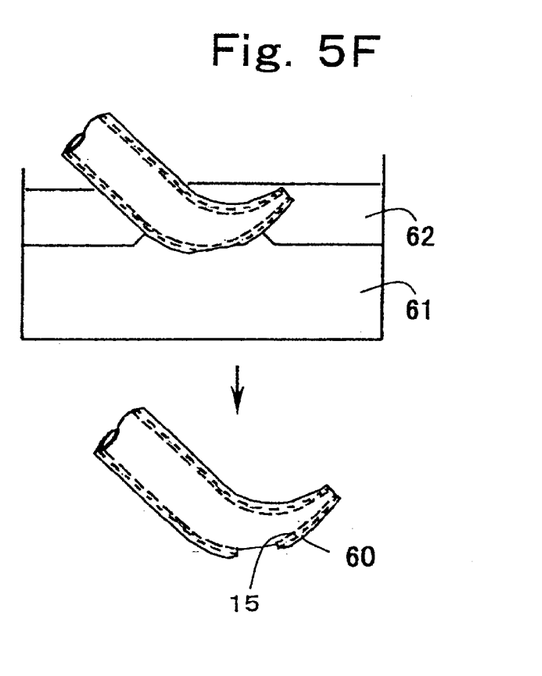

A second example of steps for fabricating a probe according to the present invention is shown in FIGS. 5A, 5B, 5C, 5D, 5E and 5F. In FIG. 5A, a part of a glass tube 20 is heated by, for example, laser beams 21 to apply tension 22 across the tube, thereby. sharpening an end of the tube and forming a tapered configuration from the end. Next, as shown in FIG. 5B, carbon dioxide gas laser beams 21 are applied to a part of a cut away tube 23 which is about 0.1 to 1 mm apart from an end 24 thereof on a side thereof in one direction. As a result, the one side is heated more significantly than the other side and, when softening begins, a bent configuration can be formed on the heated side by surface tension. When the optical lever method is used to control the distance between the sample and probe based on atomic force control, as shown in FIG. 5C, grinding is performed to form a flat portion 15 to serve as a mirror on the surface of the tube opposite the aperture. Thereafter, the tube is coated with a protective thin film 60 made of gold or the like which is not corroded by an etchant such as hydrogen fluoride water (FIG. 5D). Subsequently, as shown in FIG. 5E, the coated portion of a part of the tube opposite to the aperture 12 is removed at the bent portion 25, and the removal proceeds short of the hollow of the tube. The step of removal may be carried out using a grinding plate 26. As an alternative method, focused ion beams may be used. Thereafter, the portion from which the coating has been removed is removed by etching using an etchant such as hydrogen fluoride water to perform etching until it penetrates to the hollow. At this time, as shown in FIG. 5F, only the portion to be etched may, be put in contact with the hydrogen fluoride water in la liquid having two phases of hydrogen fluoride water 61; and an organic solvent 62 to prevent other portions from being corroded accidentally. When gold is used as the protective thin film, it also functions as a material for blocking an electromagnetic wave. In order to improve the adhesion of gold, a thin film of titanium, chromium or the like may be deposited between the glass and gold.

While grinding particles can enter the microscopic aperture at the step of removing the part of the tube opposite to the aperture 12 at the bent portion 25 until it penetrates in the first process embodiment, the second process embodiment is advantageous in that this problem does not occur, although the number of steps is increased.

Referring specifically to the size of the probe, for example, a glass tube having an outer diameter of 210 micron and an inner diameter of 127 microns may be used. An optical fiber-having an outer diameter of 125 microns may be inserted in the same. When such a glass tube having an outer diameter of 210 microns is used, it will provide a resonance frequency of about 5 to 20 kHz when fixed at a distance of 1 to 2 mm from an end thereof. Alternatively, for example, a glass tube having an outer diameter of, about 120 microns and an inner diameter of about 75 micron may be used. The size of the microscopic aperture may be processed into a size of about 50 nm to 1 micron when a glass tube is used. The metal film as a material for blocking an electromagnetic wave must have a thickness of about 100 to 250 nm.

Figure 3A:
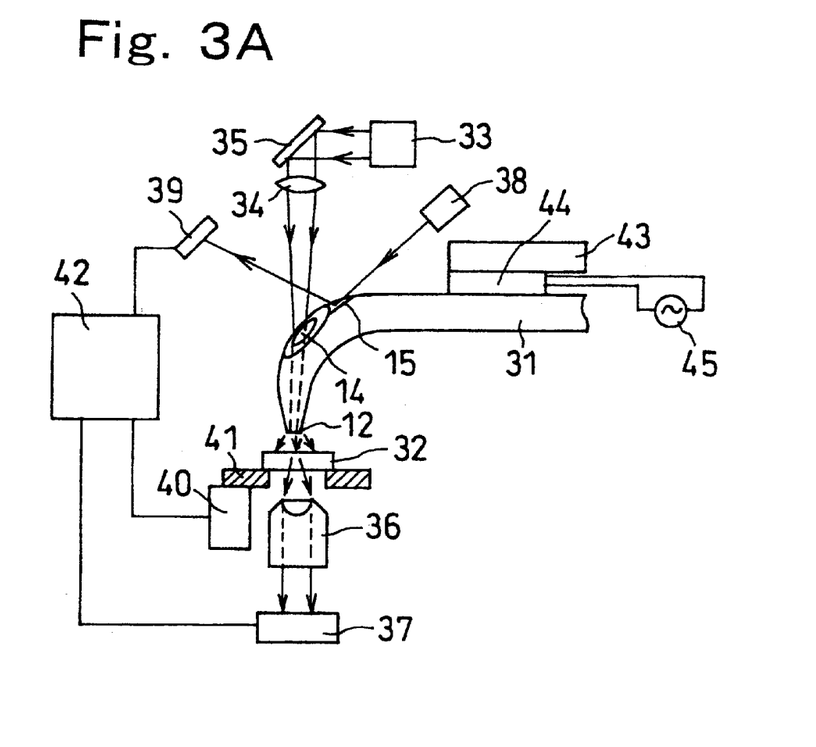
FIGS. 3A, 3B, 3C, 3D and 3E are schematic views showing configurations of near-field optical microscopes according to the present invention.

A configuration of a scanning near-field optical microscope utilizing this probe will now be described. In FIG. 3A, a probe 31 according to the present invention is provided with the microscopic aperture 12 located close to the surface of a sample plate 32; the aperture 14 formed by grinding is located in a direction perpendicular to the surface of the sample from the microscopic aperture 12; and a primary spring element of the probe 31 is provided perpendicularly to the surface of the sample. A light source 33 and an optical system consisting of a lens 34, a mirror 35 and the like are provided above the aperture 14 to collect and introduce light into said aperture 14. As a result, the surface of the sample is irradiated with light from the microscopic aperture 12. In the example of FIG. 3A, a collecting optical system 36 is provided under the sample plate 32 to collect light transmitted through the sample, and an optical detector 37 detects the intensity of the light. In this example, the distance between the end of the probe and the surface of the sample is controlled using the optical lever method in which a beam is projected on the mirror surface 15 from a light source 38 and the displacement of reflected light is detected by a divided optical detector 39 as the displacement of the probe. The sample plate 32 on a sample table 41 can be moved in X-, Y- and Z-directions by means 40 for relative movement between the probe and sample, and a controller 42 performs scanning on the XY plane and automatically performs control over the distance in the Z-direction along the configuration of the surface of the sample. The acquisition of the detected optical signal is carried out simultaneously with the control of the distance. As the mean s f or relative movement, a micrometer or stepping motor is used as a coarse movement mechanism and a piezoelectric element is used as a fine movement mechanism. Further, when the probe is controlled using oscillation, a piezoelectric diaphragm 44 may be provided between probe fixing means 43 and the probe 31, and an AC power source 45 may be used to oscillate the probe 31.

Figure 3B:
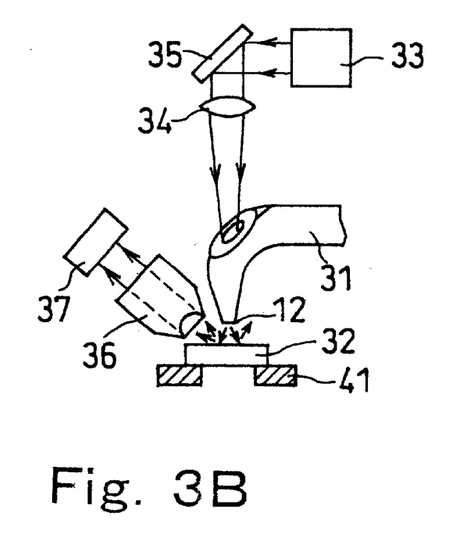

Next, FIG. 3B is a view showing a part of an apparatus as a variation of the scanning near-field optical microscope according to the present invention. This example has a configuration in which when the surface of the sample plate 32 is irradiated from the microscopic aperture 12, light in the direction of reflection from the surface is collected by the collecting optical system 36.

Figure 3C:
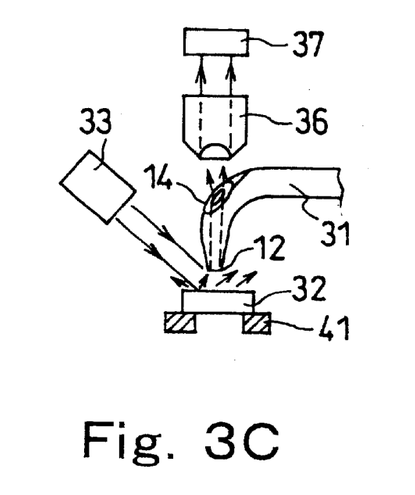

FIG. 3C shows a configuration in which the surface of a sample is directly irradiated with light, and light which has entered the probe through the microscopic aperture 12 is collected by the collecting optical system 36 through the aperture 14.

Figure 3D:
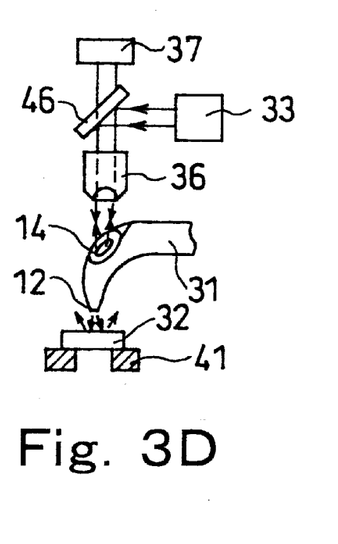

FIG. 3D shows a configuration in which the surface of the sample plate 32 is irradiated with light from the microscopic aperture 12 through the aperture 14 of the probe and in which light from the surface of the sample is collected by the collecting optical system 36 through the microscopic aperture 12 and aperture 14 to detect light transmitted through a half mirror or dichroic mirror 46.

Figure 3E:
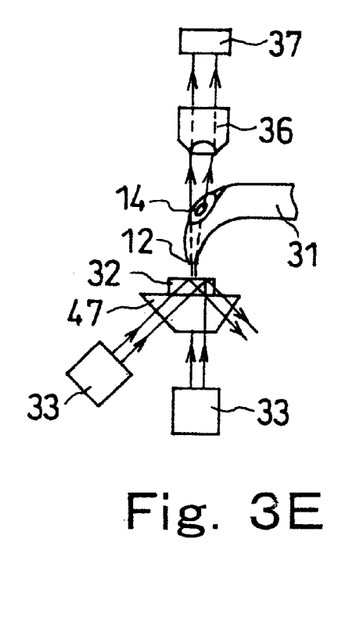

FIG. 3E shows a configuration in which light from the light source 33 is caused to impinge upon the lower surface of the sample plate 32 directly upward or at an angle which results in total reflection at the surface of the sample using an optical component 47 such as a prism and in which light from the sample surface which has passed through the aperture 14 through the microscopic aperture 12 is collected.

As the collecting optical system used in the above examples of configuration, not only a lens or the like formed of glass or crystal but also a reflection type lens (Cassegrain lens) may be used. Therefore, the above-described system may be used in the ultraviolet region or infrared region taking advantage of a probe according to the present invention.

Figure 4A:
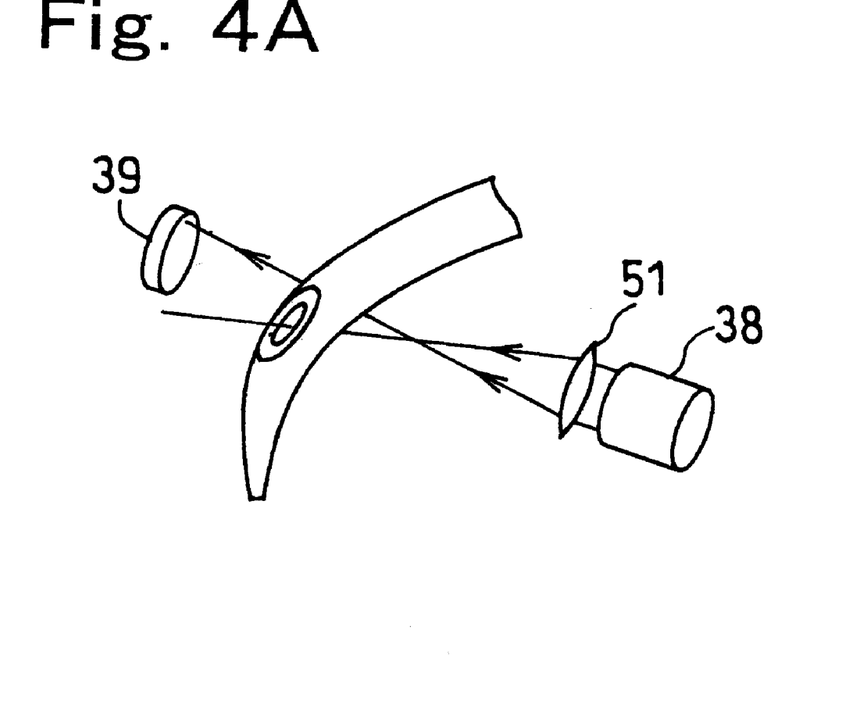
FIGS. 4A and 4B are views showing examples of means for detecting the displacement of a probe for a near-field optical microscope according to the present invention.

Further, while the optical lever method is used in the above examples as a method for detecting the displacement of a probe, other methods for detecting displacement may be used. For example, as shown in FIG. 4A, displacement may be detected also by collecting light from the light source 38 with a lens 51, projecting the same on the probe 31 on a side thereof and detecting interference light with the divided optical detector 39.

Figure 4B:
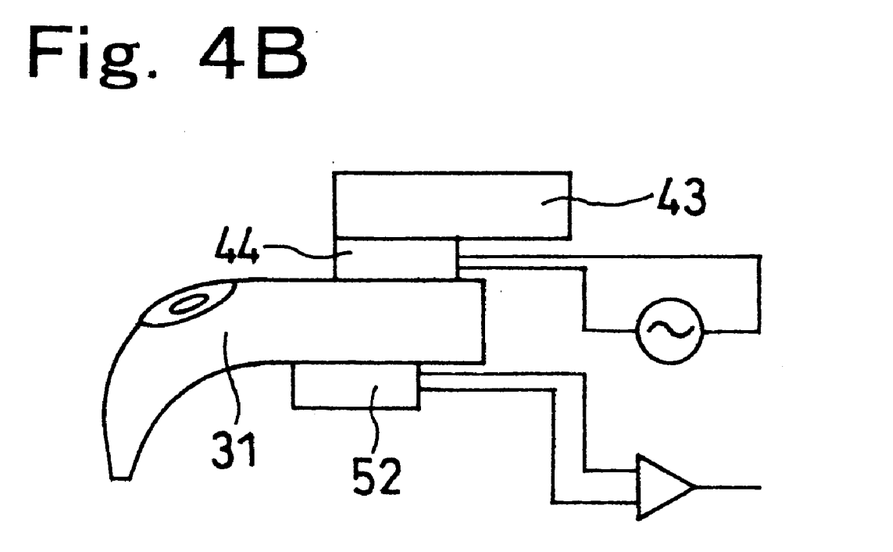

Further, as shown in FIG. 4B, the displacement of the probe may be detected by providing a piezoelectric element 52 for the detection of displacement separately from the piezoelectric diaphragm 44 and monitoring changes in electrical characteristics of the piezoelectric element.

An apparatus having the above-described configuration makes it possible to carry out observation of optical resolution of optical information in the ultraviolet region and infrared region and observation of images of features at the same time. The use of a detection element, modulation circuit, lock-in amplifier or the like depending on each measurement makes it possible to observe physical properties such as friction, visco-elasticity and surface potential at the same time., For example, the measurement of friction requires a four-division optical detector for detecting torsional components of the probe.

The probe for a near-field optical microscope and the near-field optical microscope according to the present invention have made it possible to form microscopic apertures with high reproducibility to allow practical use of the same in the art of the near-field optical microscopes for performing observation of optical resolution of optical information in the ultraviolet region and infrared region, observation of images of features and observation of physical properties such as friction, visco-elasticity and surface potential at the same time.

What is claimed is:

1. A probe for a near-field optical microscope, comprising: a tube; a tapered portion formed at a first end of the tube; a microscopic aperture formed at the tapered portion of the tube; a bent end portion formed in the tube and having the shape of a hook, the bent end portion including the tapered portion and the microscopic aperture; and a second aperture formed in the bent end portion of the tube opposite the microscopic aperture so that there is no obstacle in the space between the microscopic aperture and the second aperture.

2. A probe for a near-field optical microscope according to claim 1; wherein the tube comprises a glass tube.

3. A probe for a near-field optical microscope according to claim 1; wherein at least an outer surface of the tapered portion is coated with a material which blocks an electromagnetic wave from propagating therethrough.

4. A probe for a near-field optical microscope according to claim 1; wherein at least an inner surface of the tapered portion is coated with a material which blocks an electromagnetic wave from propagating therethrough.

5. A probe for a near-field optical microscope according to claim 1; further comprising a mirror provided on a surface of the tube opposite the microscopic aperture.

6. A probe for a near-field optical microscope according to claim 1; wherein the tapered portion of the hollow tube and the microscopic aperture are formed in the hollow tube by extending the hollow tube at a heated portion thereof and cutting the hollow tube at the heated portion when the diameter thereof reaches a desired value.

7. A probe for a near-field optical microscope according to claim 1; wherein the bent end portion is formed in the tube by heating a portion at one side of the hollow tube so that the hollow tube bends.

8. A probe for a near-field optical microscope according to claim 1; wherein the second aperture is formed by forming an opening in the bent end portion of the hollow tube in alignment with the microscopic aperture.

9. A scanning near-field optical microscope comprising: a light source; an optical system; a probe; relative movement means for causing relative movement between the probe and a sample; and an optical detector; wherein the probe comprises a tube having a tapered portion at one end, a microscopic aperture formed in the tapered portion, a bent end portion formed in the tube and having the shape of a hook, the bent end portion including the tapered portion and the microscopic aperture, and a second aperture formed in the bent end portion of the tube opposite the microscopic aperture so that there is no obstacle in the space between the microscopic aperture and the second aperture.

10. A scanning near-field optical microscope according to claim 9; wherein light from the light source is applied to a sample through the microscopic aperture by first passing through the second aperture formed in the bent end portion.

11. A scanning near-field optical microscope according to claim 9; wherein light from the surface of a sample is introduced to the optical detector through the microscopic aperture and then through the second aperture formed in the bent end portion.

12. A scanning near-field optical microscope according to claim 9; wherein the tapered portion of the hollow tube and the microscopic aperture are formed in the hollow tube by extending the hollow tube at a heated portion thereof and cutting the hollow tube at the heated portion when the diameter thereof reaches a desired value.

13. A scanning near-field optical microscope according to claim 9; wherein the bent end portion is formed in the tube by heating a portion at one side of the hollow tube so that the hollow tube bends.

14. A scanning near-field optical microscope according to claim 9; wherein the second aperture is formed by forming an opening in the bent end portion of the hollow tube in alignment with the microscopic aperture.

15. A method for manufacturing a probe for a near-field optical microscopes comprising the steps of:
   sharpening an end of a tube and forming a tapered portion at one end thereof and a first aperture at a tip of the tapered portion;
   bending the tube near the one end to form a bent portion;
   forming a second aperture in the tube by removing a part of the tube in the bent portion opposite the first aperture formed in the bent portion until the hollow center of the tube is reached; and
   coating at least one of an outside surface and an inside surface of the tube in the tapered portion with a material which blocks an electromagnetic wave.

16. A method for manufacturing a probe for a near-field optical microscope according to claim 15; further comprising the step of forming a flat portion to serve as a mirror on the surface of the tube opposite the first aperture between the step of forming the bent portion and the step of coating the outside surface of the tapered portion with a material which blocks an electromagnetic wave.

17. A method for manufacturing a probe for a near-field optical microscope according to claim 15; wherein the tube is a glass tube.

18. A method for manufacturing a probe for a near-field optical microscope according to claim 15; wherein the step of sharpening and forming a tapered portion comprise the steps of extending the tube at a heated portion thereof and cutting the hollow tube at the heated portion when the diameter thereof reaches a desired value.

19. A method for manufacturing a probe for a near-field optical microscope according to claim 15; wherein the step of bending the tube is performed by heating a portion of the tube at one side thereof so that the tube bends.

20. A method of manufacturing a probe for a near-field optical microscope comprising the steps of:
   sharpening an end of a tube and forming a tapered portion at one end thereof and a first aperture at a tin of the tapered portion;
   bending the tube near the one end to form a bent portion;
   coating the tube with an anti-etching thin film;
   removing the thin film coating from a part of the tube in the bent portion opposite the first aperture formed in the bent portion and removing the underlying portion of the tube in the part where the thin film coating is removed to a position short of the hollow in the tube; and
   performing etching with an etchant such that the etching removes the underlying portion of the tube in the part wherein the thin film coating has been removed and penetrates to the hollow of the tube.

21. A method for manufacturing a probe for near-field optical microscope according to claim 20; further comprising the step of forming a flat portion to serve as a mirror on the surface of the tube opposite the first aperture between the step of forming the bent portion and the step of coating the tube-with an anti-etching thin film.

22. A method for manufacturing a probe for a near-field optical microscope according to any one of claims 15, and 20; further comprising the step of forming a coating film on an inner surface of the tube.

23. A method for manufacturing a probe for a near-field optical microscope according to claim 20; wherein the tube is a glass tube.

24. A method for manufacturing a probe for a near-field optical microscope according to claim 20; wherein the step of sharpening and forming a tapered portion comprise the steps of extending the tube at a heated portion thereof and cutting the hollow tube at the heated portion when the diameter thereof reaches a desired value.

25. A method for manufacturing a probe for a near-field optical microscope according to claim 20; wherein the step of bending the tube is performed by heating a portion of the tube at one side thereof so that the tube bends.

26. A probe comprising: a tube; a tapered portion formed at a first end of the tube; a first aperture formed at the tapered portion of the tube; a bent end portion formed in the tube and having the shape of a hook, the bent end portion including the tapered portion and the first aperture; and a second aperture formed in the bent end portion of the tube opposite the microscopic aperture so that there is no obstacle in the space between the first aperture and the second aperture; wherein the tapered portion is formed by thermally extending the tube at a portion so that the tube becomes narrowed at the extended portion and cutting the tube at the extended portion when the diameter thereof reaches a desired value.

27. A probe according to claim 26; wherein the tube comprises a glass tube.

28. A probe according to claim 26; wherein at least one of an outer surface and an inner surface of the tube in the tapered portion is coated with a material which blocks an electromagnetic wave from propagating therethrough.

29. A probe according to claim 26; further comprising a mirror provided on a surface of the tube opposite the first aperture.

30. A probe according to claim 26; wherein the bent end portion is formed in the tube by heating a portion at one side of the hollow tube so that the tube bends.

* * * * *